July 16, 1968     J. W. RYAN ETAL     3,392,991
VELOCIPEDE
Filed Aug. 1, 1966     4 Sheets-Sheet 1
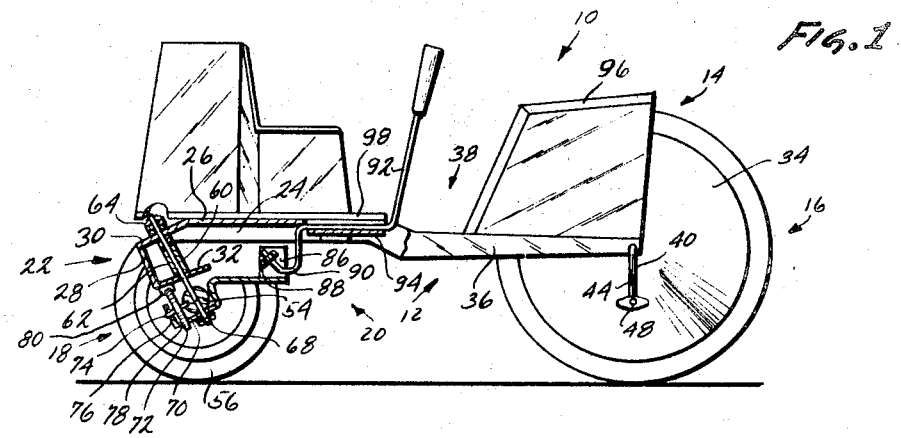
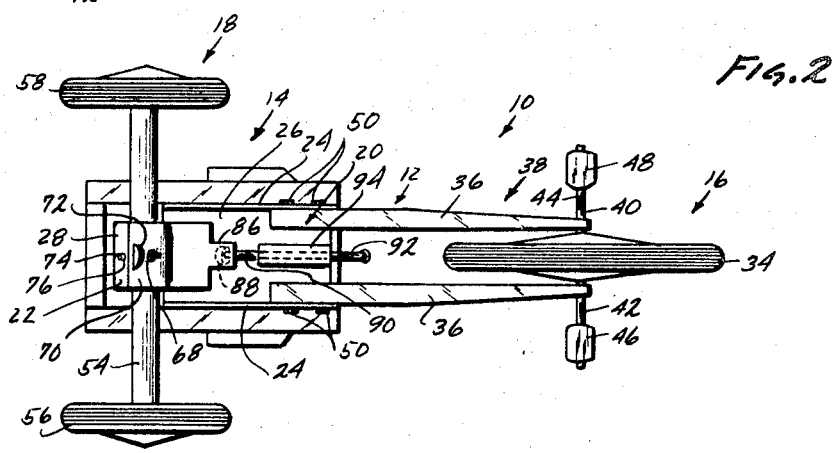
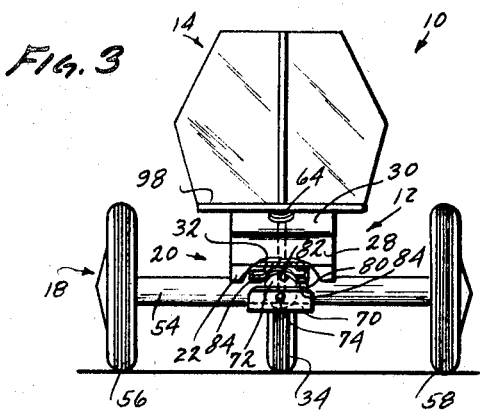
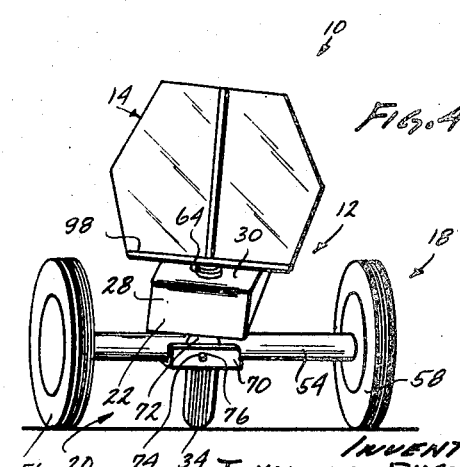
INVENTORS
JOHN W. RYAN
ROBERT A. MACMEEKIN
BY Herzig, Walsh & Blackham
ATTORNEYS July 16, 1968     J. W. RYAN ETAL     3,392,991

VELOCIPEDE

Filed Aug. 1, 1966     4 Sheets-Sheet 2

INVENTORS
JOHN W. RYAN
ROBERT A. MACMEEKIN

BY *Herzig, Walsh & Blockham*
ATTORNEYS

July 16, 1968    J. W. RYAN ETAL    3,392,991
VELOCIPEDE
Filed Aug. 1, 1966    4 Sheets-Sheet 3
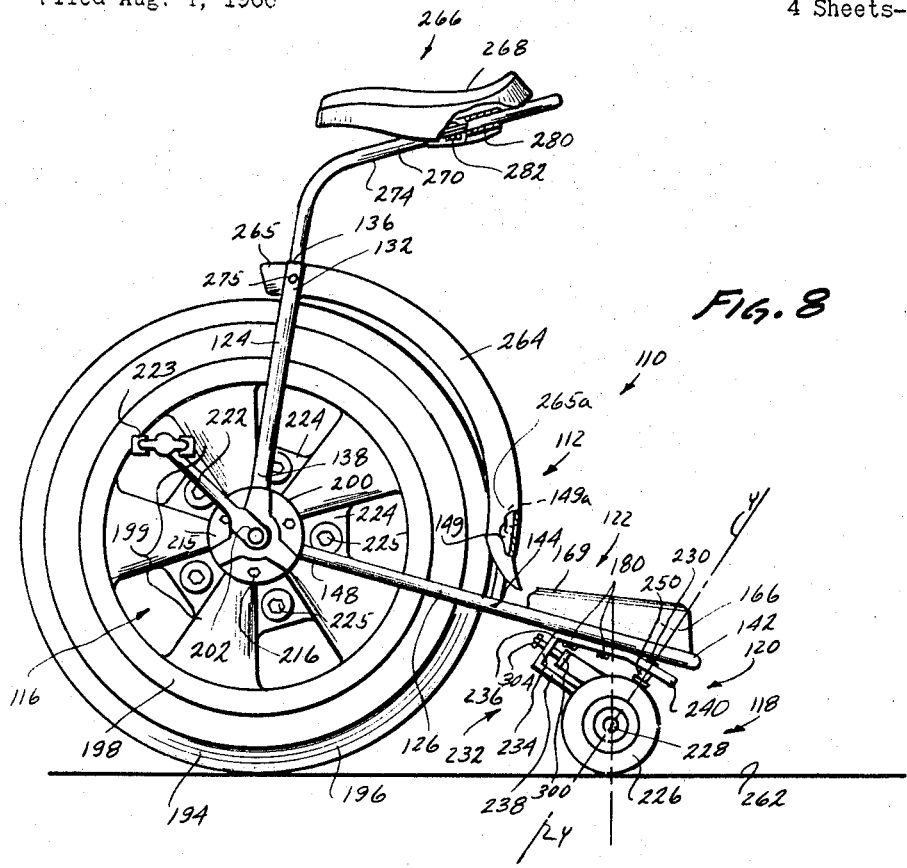
FIG. 8
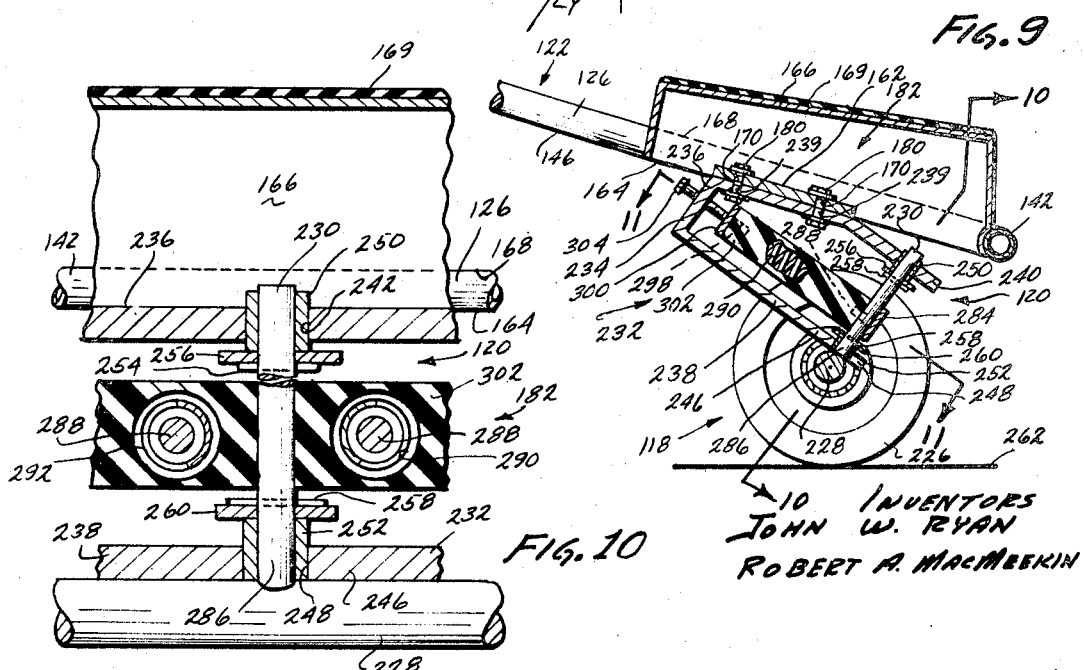
FIG. 9
FIG. 10
INVENTORS
JOHN W. RYAN
ROBERT A. MacMEEKIN
BY Herzig, Walsh & Blackham
ATTORNEYS July 16, 1968  J. W. RYAN ETAL  3,392,991
VELOCIPEDE
Filed Aug. 1, 1966  4 Sheets-Sheet 4
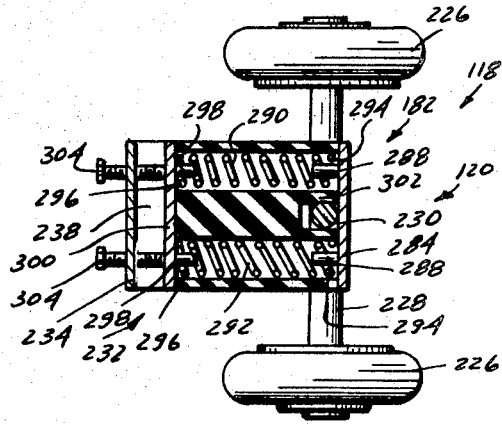
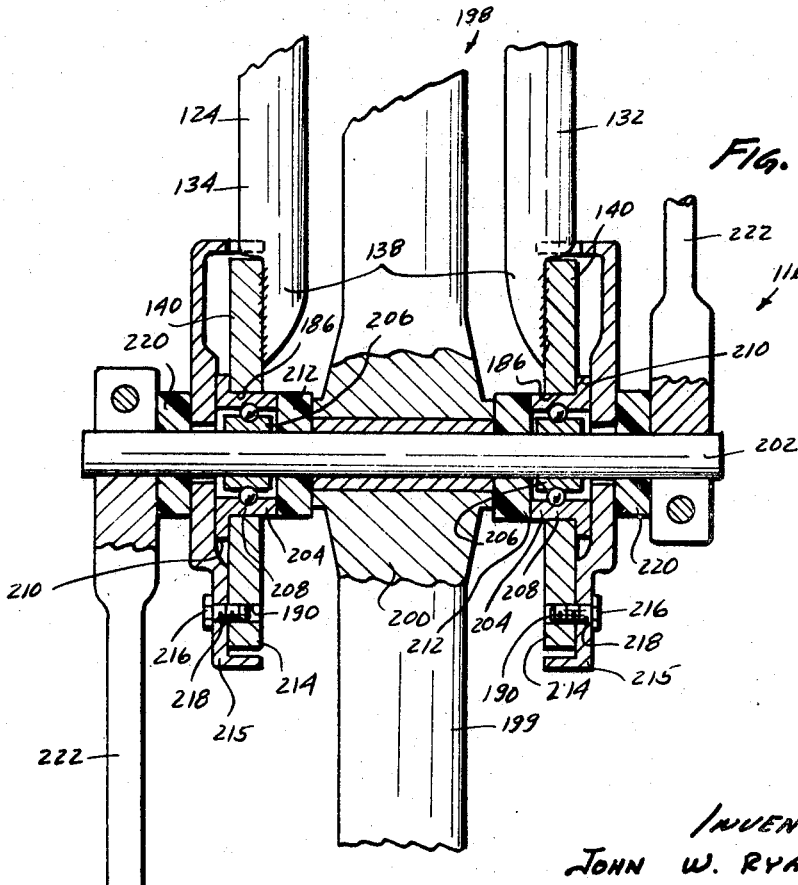
INVENTORS
JOHN W. RYAN
ROBERT A. MacMEEKIN
BY Herzig, Walsh & Blackham
ATTORNEYS

United States Patent Office 3,392,991
Patented July 16, 1968

1

3,392,991
VELOCIPEDE
John W. Ryan, Bel Air, and Robert A. MacMeekin, Huntington Beach, Calif., assignors to Mattel, Inc., Hawthorne, Calif., a corporation of California
Continuation-in-part of application Ser. No. 447,208, Apr. 12, 1965. This application Aug. 1, 1966, Ser. No. 569,116
9 Claims. (Cl. 280—282)

ABSTRACT OF THE DISCLOSURE

A toy vehicle in the form of a unicycle having novel frame constructional features and a self-steering arrangement comprising a pair of wheels journalled on an axle having a pivot pin rigidly fixed thereto with the pivot pin journalled on the vehicle frame on an oblique axis. The pivot pin is provided with lateral projections, each of which is engaged by a compression spring reacting against an adjustable frame portion to center the steering wheels to a straight-ahead position. The springs are encased in a body of rubber and an adjustable seat is provided on the frame which consists of a front fork, a rearwardly extending U-shaped portion and an arcuate bracing member, all rigidly secured together, a pedalled large wheel being journalled in the fork and the steerable wheels being mounted on the rearwardly extending frame portion.

---

This application is a continuation-in-part of copending application Ser. No. 447,208 filed Apr. 12, 1965, now Patent No. 3,311,388 by the applicants herein.

The present invention relates to a toy vehicle and more particularly to a new and useful toy vehicle having steerable wheel means, means for steering the wheel means and means for biasing the steering means to a central position wherein the vehicle is steered straight ahead.

As pointed out in said copending application, many types of prior art toy vehicles are known. They usually take the form of velocipedes so that they can be propelled by the feet. With one type of prior art velocipede now in general use, the pedaling and steering are both effected through a single front wheel with a pair of rear wheels being rotatably mounted in rigid, parallel relation at all times. While generally satisfactory, this type of velocipede does have several disadvantages. One disadvantage resides in the fact that the pivotal mounting of the front wheel interferes with the pedaling of the velocipede because the front wheel must be turned at a sharp angle when making a turn. Another disadvantage resides in the fact that the handle bars, being secured to the front wheel, turn to an objectionable position when the front wheel is turned to execute a turn or negotiate a corner. Yet another disadvantage resides in the fact that such velocipedes have a high center of gravity which makes them difficult to handle during turning maneuvers. In an effort to overcome some of the foregoing disadvantages, other prior art velocipedes have been provided with three-wheels wherein the front wheel is used for pedaling only and the steering is effected by a turning of the rear wheels. While generally satisfactory in overcoming some of the foregoing disadvantages, this arrangement introduced the disadvantage that, once a turning maneuver was undertaken, it was difficult to return the steering means to a central position wherein the velocipede was again steered on a straight course.

Another type of prior art velocipede now in general use is the unicycle. This type of velocipede has the disadvantage that it requires a rather skilled operator to maneuver it. Another disadvantage resides in the fact that a unicycle is not free-standing.

2

In view of the foregoing factors and conditions characteristic of toy vehicles, it is a primary object of the present invention to provide a new and useful toy vehicle not subject to the disadvantages enumerated above and having steerable rear wheels, means for steering the rear wheels and means for biasing the steering means to a central position.

Another object of the present invention is to provide a three wheeled velocipede wherein the front wheel is used for pedaling only and the steering is effected by turning of the rear wheels in such a manner that the velocipede is banked during a turn.

Yet another object of the present invention is to attach the seat of a vehicle of the type described to a cam face which co-acts with a cam upon rotation thereof through the vehicle's steering mechanism to cause the seat of the vehicle to be raised when the steering mechanism is moved away from a central position so that the center of gravity of a rider of the vehicle will also be raised, thereby biasing the steering mechanism back to the central position.

A further object of the present invention is to provide a velocipede having weight-actuated steering means.

A still further object of the present invention is to provide a self-returning support means for a unicycle.

According to a first embodiment of the present invention, a toy vehicle is provided in the form of a three wheeled velocipede having a front fork which carries a pedal-driven wheel. The front fork is rigidly affixed to a frame member in such a manner that the wheel cannot be turned. The rear wheels are rotatably mounted on an axle member which is pivotally connected to the vehicle frame by an oblique pin in such a manner that turning of the vehicle by swinging the rear axle also tilts the axle. The seat for the vehicle carries a cam follower which co-acts with a cam. The cam is connected to the rear axle in such a manner that the cam swings in an arcuate path when the rear axle is swung by a linkage system which is connected to a swingable steering lever. The cam follower is shaped in such a manner that the cam causes the vehicle seat to be raised when the steering lever is moved away from its central position. Thus, the center of gravity of a rider is raised to bias the steering lever to its central position.

According to a second embodiment of the present invention, a toy vehicle is provided in the form of a unicycle having a front fork which carries a pedal-driven, large-diameter wheel. The fork is of tubular construction including a bight portion and a pair of parallel, depending arms having open tops adjacent the bight portion for telescopically receiving a tubular, seat-supporting member. A weight-actuated steering means is connected to the lower end of the fork by a rigid, U-shaped framing member having arms which straddle the pedal-driven wheel and extend rearwardly to a bight portion positioned behind the wheel. This framing member is supported adjacent its bight portion by a tubular, arcuate member extending from the framing member upwardly and forwardly to the bight portion of the front fork. The arcuate tubular member also serves as a support for a fender.

The weight-actuated steering means is connected to the framing member adjacent its bight portion by a U-shaped saddle member having a bight portion positioned adjacent the rear portion of the front wheel. A pair of small-diameter wheels are rotatably mounted on a rigid axle having a spindle rigidly affixed thereto. The spindle is journalled for rotation in the U-shaped saddle on an oblique axis. A flat plate is affixed to this oblique spindle with the major axis of the plate lying normal to the major axis of the spindle. A pair of compression springs co-act between this spindle plate and the bight portion of the U-shaped saddle for returning the small-diameter rear wheels to a central position after turning movements have been executed. The oblique axis on the spindle causes these turning movements when the center of gravity of the load on the vehicle is shifted in such a manner that the large-diameter wheel leans in the direction of a desired turn. Thus, the small-diameter wheels pivot in a predetermined manner about the oblique spindle. The rear axle positions the small-diameter wheels just far enough apart so that they will support the vehicle in a free-standing position, but close enough together that swinging of the wheels about the oblique spindle is easily accomplished by shifting the weight of the load on the vehicle.

Leaning and pivoting provide a large range of stable operation and greater equilibrium than that obtained from a tricycle or a bicycle because of the dynamic forces present. Approximately 9° of tipping from its dynamic center is within the range of operation of the vehicle, i.e., its large wheel tips 9° from the vertical when not moving and maintains its free-standing attitude.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a side elevational view, with parts broken away to show internal construction, of a toy vehicle comprising a first embodiment of the present invention;

FIGURE 2 is a bottom view of the vehicle of FIG. 1;

FIGURE 3 is a rear view of the vehicle of FIG. 1, with parts broken away to show internal construction;

FIGURE 4 is a rear view of the vehicle of FIG. 1 showing the relationship of certain parts thereof during a turning maneuver;

FIGURE 8 is an elevational view of the vehicle of FIG. 5;

FIGURE 9 is an enlarged partial cross-sectional view taken along line 9—9 of FIG. 5;

FIGURE 10 is an enlarged, partial cross-sectional view taken along line 10—10 of FIG. 9;

FIGURE 11 is a partial cross-sectional view taken along line 11—11 of FIG. 9; and FIGURE 12 is an enlarged, partial cross-sectional view taken along line 12—12 of FIG. 5.

Figure 5:
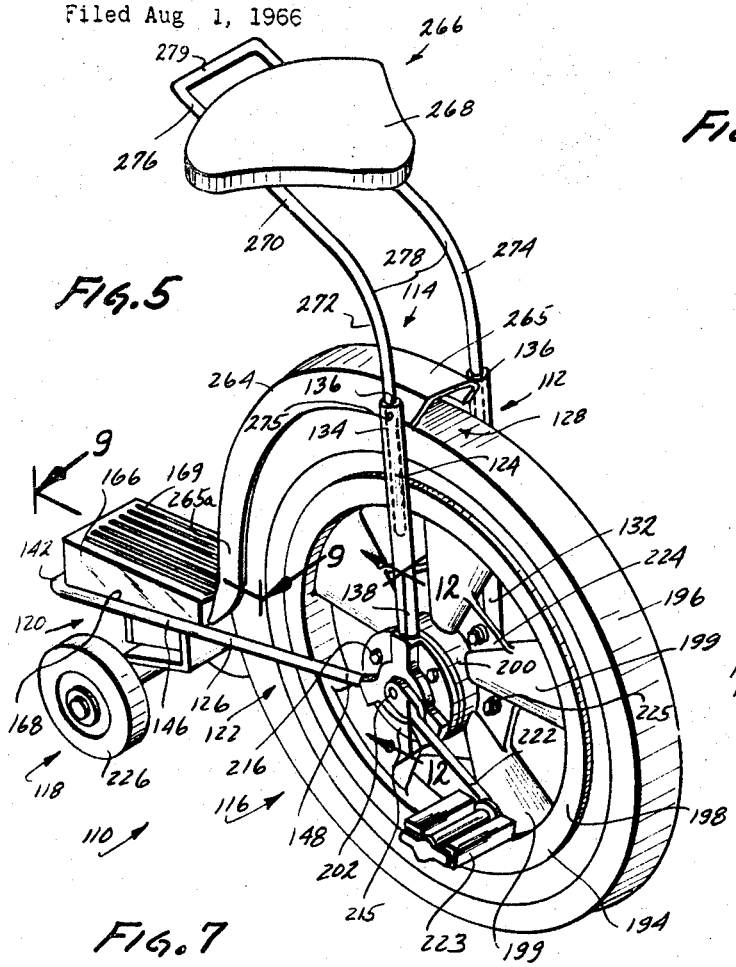
FIGURE 5 is a perspective view of a toy vehicle constituting a second embodiment of the present invention.

Referring again to the drawings and more particularly to FIGS. 1-4, a toy vehicle constituting a first embodiment of the present invention, generally designated 10, includes a chassis 12 and a body assembly 14. The chassis 12 includes a front wheel assembly 16, a rear wheel assembly 18 and a steer mechanism 20. The chassis 12 also includes a frame member 22 having depending, parallel, spaced-apart sidewalls 24 at its forward end and a top wall 26, which is joined to a rear wall 28 by a sloping portion 30. The depending walls 24 extend from the front to the rear and down the rear wall 28 of the frame 22, which also has a bottom wall 32.

The front wheel assembly 16 includes a pedal-driven wheel 34 which is rotatably mounted between the arms 36 of a fork assembly 38 by a pedal-driven crank 40. The crank 40 includes oppositely disposed crank arms 42 and 44 having pedals 46 and 48, respectively, rotatably mounted thereon. The fork assembly 38 is connected to the frame 22 by suitable bolts 50 which connect each of the arms 36 to an associated, depending sidewall 24.

The rear wheel assembly 18 includes a rear axle 54 which has wheels 56 and 58 rotatably mounted on the ends thereof and which is pivotally connected to the frame 22 by a pivot pin or spindle 60. The upper portion of the pivot pin 60 passes through a bushing 62 and the sloping portion 30 of top wall 26 and is retained in position by suitable retaining means 64. The lower portion of the pin 60 passes through the axle 54 and a steering lever 66, which is rigidly affixed to the axle 54. The axle 54 is prevented from becoming disengaged from the pin 60 by a suitable nut 68 which threadedly engages the lower end of the pin 60 and bears against the steering lever 66. The steering lever 66 includes a saddle portion 70 extending rearwardly and upwardly from the axle 54. A cam follower 72 is rotatably mounted in the saddle 70 on a pin 74 which engages apertures 76 provided in the saddle 70 and the axle 54, respectively. The cam follower 72 extends through an opening 78 provided in the saddle 70 and engages a cam 80 which is rigidly affixed to the bottom wall 32 on frame 22. The cam follower 72 is normally seated in an arcuate portion 82 provided on the cam 80, but is free to swing with the axle 54 as it pivots about the pin 60 so that the cam follower 72 will engage the depending portions 84 provided on each side of the arcuate portion 82. This causes the frame 22 to rise while it is simultaneously tilting by virtue of the oblique mounting of pivot pin 60.

The steering lever 66 forms part of the steering mechanism 20 and include a journal box 86 in which a steering knuckle 88 is journaled. The steering knuckle 88 is affixed to one end 90 of a steering control lever 92 which also forms a part of the steering mechanism 20. The steering control lever 92 is rotatably connected to the frame 22 by a bushing 94 and may be swung from a vertical or central position in a first direction to cause the vehicle 10 to negotiate a left hand turn or the control lever 92 may be swung in a second direction to cause the vehicle 10 to negotiate a right hand turn. Swinging the control lever 92 causes the axle 54 to pivot on the pin 60 bringing the cam follower 72 into engagement with one of the portions 84 causing the frame 22 to rise. Simultaneously, the axle 54 is caused to tilt by the angle of pin 60. Since the fork assembly 38 is rigidly affixed to the frame 22, tilting of the frame in the manner described causes the front wheel 34 to lean over in the direction of the turn, as shown in FIG. 4. Raising the frame 22 raises the center of gravity of the driver of the vehicle 10. This biases the control lever 92 to an upright or central position minimizing the force required to resume steering the vehicle 10 on a straight course.

The body 14 includes a front fender 96 which serves as a mud guard for the wheel 34. The body 14 also includes a seat 98 which is rigidly affixed to the frame 22 in such a manner that the seat will rise and tilt with the frame during negotiation of turns. Thus, there is a simulation of the banking of an aircraft as the wheel 34 and the seat 98 lean in the direction of a turn.

From the foregoing, it is apparent that the vehicle 10 includes (1) steerable wheel means comprising the rear wheel assembly 18, (2) means for steering the wheel means comprising pivot pin 60 and steering mechanism 20 and (3) means for biasing the steering means to a central position comprising cam follower 72 and cam 80.

Figure 6:
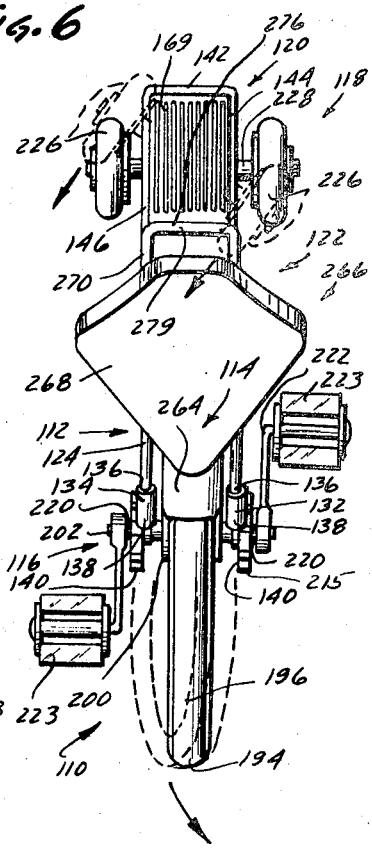
FIGURE 6 is a plan view of the vehicle of FIG. 5.
Figure 7:
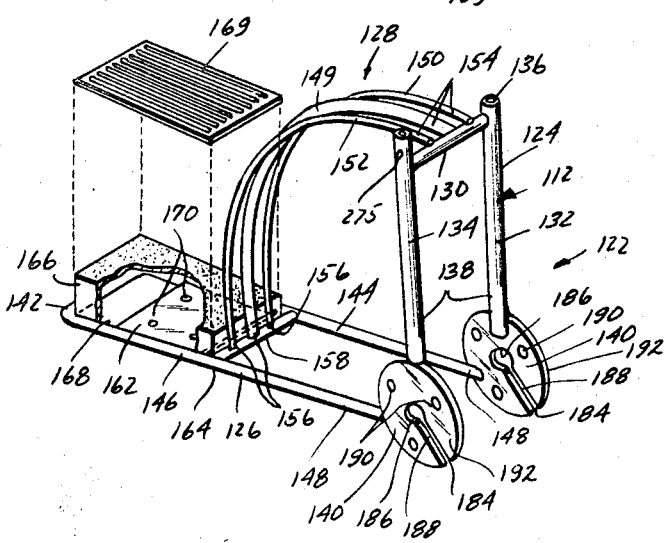
FIGURE 7 is an exploded, perspective view of the frame portion of the vehicle of FIG. 5.

Referring now to FIGS. 5-12, a toy vechile constituting a second embodiment of the present invention, generally designated 110, includes a chassis 112 and a body assembly 114. The chassis 112 includes a front wheel assembly 116, a rear wheel assembly 118 and a weight-actuated steering means 120. The chassis 112 also includes a frame 122 having an upstanding fork assembly 124, a U-shaped frame member 126 and an arcuate bracing member 128.

The fork assembly 124 includes a bight portion 130 and a pair of depending arms 132, 134. Each arm 132, 134 is of hollow, tubular construction and includes an upper, open end 136, which is attached to the bight portion 130 in such a manner that the open end 136 is accessible for telescopically receiving a portion of the body 114 to be hereinafter described. Each arm 132, 134 also includes a lower end 138 which carries a depending hub member 140.

The U-shaped frame member 126 includes a bight portion 142 and a pair of parallel arms 144, 146, each of which includes an end 148. The ends 148 are affixed to associated hubs 140 substantially normal to the arms 132, 134 on the fork 124.

The arcuate member 128 includes a central tubular member 149 and outer tubular members 150, 152 each having an end 154 affixed to the bight portion 130 on fork 124 and a second end 156 affixed to a cross member 158 having its ends affixed to associated arms 146, 144 intermediate the ends 148 and bight portion 142 on frame 126.

The frame 122 also includes a mounting plate 162, which is affixed to the underside 164 of frame member 126, and a step plate 166, which is affixed to the upper side 168 of the frame member 126. A step pad 169 is affixed to the step plate 166 for providing a suitable footing for a user of the plate 166.

The mounting plate 162 includes a plurality of apertures 170 which receive associated bolt and nut assemblies 180 for affixing the rear wheel assembly 118, the weight-actuated steering means 120 and a biasing or centering means 182 to the frame member 126 intermediate the cross-bar 158 and the bight portion 142.

Each hub 140 may be made from a suitable material, such as steel, and is provided with a keyhole aperture 184 (FIG. 7) having a central, circular portion 186 communicating with a sloted portion 188. Each hub 140 is also provided with a plurality of internally-threaded apertures 190 on the outer face 192 thereof.

The front wheel assembly 116 includes a large-diameter wheel 194 having a pneumatic tire 196 mounted on a suitable rim 198 from which a plurality of spokes 199 extend to a central hub 200 (FIG. 12). An axle 202 is frictionally engaged in the hub 200 for rotatably mounting the wheel 194 between the arms 132 and 134 of the fork assembly 124 and the arms 144 and 146 of the frame member 126 in a pair of ball-bearing members 204. Each bearing member 204 includes an inner race 206 and an outer race 208. An annular shoulder 210 is provided on each race 208 for engagement with the face 192 on an associated hub 140 when a bearing member 204 is in positioned in an aperture 184.

Before the wheel 194 is positioned between the arms 132, 134, a low-coefficient-of-friction spacer 212 is placed on the axle 202 adjacent each side of the hub 200. The axle 202 may then be moved into position within the central portions 186 of apertures 184 by passing the axle 202 through the slots 188 with the spacers 212 in position between the hub 200 and the inner face 214 of an associated hub 140. A bearing member 204 may then be slipped over each end of the axle 202 and slid into position with each race 208 seated in an associated aperture 184 and with each annular shoulder 210 bearing against the outer face 192 of an associated hub 140. A retainer plate 215 may then be slipped over each end of the axle 202 and affixed to an associated hub 140 by inserting a cap screw 216 through each of a plurality of apertures 218, provided in an associated retainer 215, and by threadedly engaging the screws 216 in associated internally-threaded apertures 190. A low-coefficient-of-friction, cylindrical spacer 220 may then be installed on each end of the axle 202 to maintain an associated crank arm 222 a fixed distance from the retainer plate 215 on each end of the axle 202. Each crank arm 222 carries a rotatable pedal 223 for actuation by a rider of the vehicle 110 to cause the front wheel 194 to rotate.

The spokes 199 on wheel 194 may be reinforced by a plurality of reinforcing members 224 extending radially from the hub 200 between the spokes 199. If desired, the spokes 199, members 224 and hub 200 may be formed integrally by molding techniques. Also, if desired, the members 224 may be decorated by simulated lug bolts 225.

The rear wheel assembly 118 includes a pair of small-diameter wheels 226 which are rotatably mounted on a rear axle 228. The wheel assembly 118 is swingably connected to the frame member 126 by the weight-actuated steering means 120 which includes a pivot pin or spindle 230 and a U-shaped saddle member 232. The saddle member 232 includes a bight portion 234, an upper arm 236 and a lower arm 238. The upper arm 236 is provided with a plurality of apertures 239 (FIG. 9) for receiving the bolt and nut assemblies 180. The arm 236 includes an end 240 which is provided with an aperture 242 and which slopes rearwardly and downwardly from the plate 162. The lower arm 238 includes an end 246 which is provided with a U-shaped slot 248.

The spindle 230 is rotatably mounted in the saddle member 232 by an upper bushing 250 and a lower bushing 252 and is retained in position therein by a first cotter key 254 held against an annular flange 256 provided on the upper bushing 250 and by a second cotter key 258 held against an annular flange 260 provided on the lower bushing 252. The bushings 250 and 252 are preferably made from a plastic material having a low-coefficient-of-friction and are press-fit into their associated apertures 242 and 248, respectively.

The spindle 230 is positioned in the saddle member 232 in such a manner that the longitudinal axis Y—Y (FIG. 8) of the spindle 230 is inclined rearwardly a predetermined pivot angle A from a vertical plane. During turning maneuvers of the vehicle 110, the rate of tipping of the front wheel assembly 116 and the rate of turning of the rear wheel assembly 118 is a function of this pivot angle A. It is obvious that the rate of turning of the rear wheel assembly 118 must be sufficiently high to permit the wheels 226 to follow the turning radius of the vehicle 110. It has been found that a pivot angle A within the range of approximately 20–45 degrees is satisfactory for a vehicle 110 having a 12 inch wheel base.

The appearance of the vehicle 110 is enhanced by placing the rear wheels 226 fairly close together. However, if these wheels 226 are placed too close together, the vehicle 110 is less tolerant to variations in the weight of riders. During a turn, the tipping moment on the front wheel assembly 116 may exceed the centrifugal force thereon because of the comparatively long lever arm through which the weight of a rider acts. It is, of course, apparent that the resultant of the tipping moment and the centrifugal force should fall inside the three points of contact which the wheels 194 and 226 make with a surface 262, upon which the vehicle 10 is riden, for riding stability. It has been found that placing rear wheels 226 approximately 8–9 inches apart results in satisfactory stability without unduly sacrificing the appearance of the vehicle.

The body 114 includes a fender 264, which is connected to the frame 122 by wedging the upper end 265 thereof between the arms 132, 134 on top of the bight portion 130 and by securing the lower end 265a of fender 264 to the end 156 of tubular member 149 by a screw 149a. Alternatively, the tubular members 149, 150 and 152 may be dispensed with by manufacturing the fender 264 with sufficient structural strength that it may be secured to the bight portion 130 and the cross bar 158 to function both as a fender and as an arcuate member 128. The body 114 also includes a seat assembly 266. The seat assembly 266 includes a seat member 268 and a seat support 270. The seat support 270 includes a pair of parallel spaced-apart arms 272, 274 which are telescopically received in the ends 136 of fork arms 132 and 134, respectively and which are locked by associated set screws 275 threadedly engaging the ends 136 of associated fork arms 272, 274. The support 270 also includes a U-shaped member 276 which is formed integrally with the arms 272 and 274 and which slopes rearwardly and upwardly from the upper ends 278 thereof. The member 276 includes a bight portion 279 extending rearwardly of the seat member 268 where it may serve as a hand grip for a passenger standing on the step member 166, if desired. The seat member 268 is adjustably mounted on the U-shaped member 276 by a plate 280 (FIG. 8) which is secured to the seat member 268 in clamping engagement with the U-shaped member 276 by a plurality of cap screws, like the one shown at 282. The seat member 268 is preferably located on the U-shaped member 276 in such a position that the center of gravity of a rider on the vehicle 110 is approximately within the three contact points on surface 262 so that the weight of the rider may be used to actuate the turning means 120 by having the rider lean in the direction of a proposed turn. Since the spindle 230 is oblique, the weight of the rider causes the axle 228 to swing in a proper manner for executing a turn. For example, should the rider lean to the left, as viewed from the rear of vehicle 110 in FIG. 6, the axle 228 and the small-diameter wheels 226 will swing clockwise to the positions shown in broken lines in FIG. 6.

After a turn has been completed, the steering means 120 is biased to a central, straight-ahead position by the biasing means 182 which includes a plate 284 (FIGS. 9 and 11) affixed to the spindle 230 near the end 286 thereof which in turn, is affixed to the axle 228. A pin 288 is affixed to each end of the plate 284 and each pin 288 extends toward the bight portion 234 of the saddle 232. The biasing means 182 also includes a pair of compression springs 290, 292 each of which has an end 294 engaged on an associated pin 288 for bearing against plate 284 and an end 296 engaged by an associated pin 298 provided on the ends of a pressure plate 300. The springs 290, 292 are both embedded in a rubber block 302 for damping the springs and minimizing any noise which might be created thereby. The springs 290, 292 may be adjusted for stiffness by associated adjusting screws 304 which are threadedly engaged in the bight portion 234 of saddle 232 and which extend into engagement with the pressure plate 300. In addition, the adjusting screws 304 may be used to adjust the alignment of the axle 228. Less weight is required to turn the rear wheel assembly 118 when the springs 290, 292 are only slightly compressed, normally. Conversely, a heavier weight is required to turn the wheel assembly 118 when the springs 290, 292 are fairly tightly compressed.

Since the seat assembly 266 positions a rider on the vehicle 110 in such a manner that a comparatively large tipping moment is created, the wheel assembly 118 would be turned by the slightest unbalance on the seat assembly 266. Thus, it would require a rather skillful rider to maintain the vehicle 110 in a balanced condition without the springs 290, 292 or equivalent means, creating a centering force which builds up at a higher rate than the tipping moment.

In use, a rider of the vehicle 110 may propel it forwardly by actuating the pedals 223 while remaining in an erect position. The centering means 182 automatically maintains the rear wheel assembly 118 and the steering means 120 in such a position that the vehicle 110 will move in a straight line. When it is desired to turn left, for example, the rider leans in that direction, as viewed from the rear of vehicle 110 in FIG. 6, shifting his weight over the steering means 120 so that spindle 230 will swing the axle 228 to the broken line position shown in FIG. 6. As soon as the rider resumes his erect position, the centering means 182 will automatically bring the axle 228 back to its normal position under the influence of the springs 290, 292.

While the particular toy vehicles herein shown and described in detail are fully capable of attaining the objects and providing the advantages hereinbefore stated, it is to be understood that they are merely illustrative of the presently prefered embodiments of the invention and that no limitations are intended to the details of construction or design herein shown other than as defined in the appended claims.

What is claimed is:

1. A toy vehicle, comprising:
    frame means having a single drive wheel journalled thereon;
    steerable wheel means including an axle and a pair of steerable wheels rotatably mounted on said axle;
    an oblique pivot pin fixed to said axle and journalled on said frame means on an oblique axis; and
    means for biasing said steering means to a central position, comprising projections fixed to and extending laterally from said pivot pin and a pair of springs, each reacting against one of said projections and a portion of said frame to respectively oppositely bias said pivot pin.

2. A vehicle as stated in claim 1 wherein said steerable wheels comprise small-diameter rear wheels and wherein said drive wheel is a large-diameter, pedal-driven front wheel.

3. A vehicle as defined in claim 1 wherein said springs are compression springs; and a block of rubber-like material enclosing said springs.

4. A vehicle as defined in claim 1 wherein said portion of said frame is adjustably mounted for movement toward and from said projections whereby to vary the force exerted by said springs.

5. A vehicle having a frame comprising:
    a fork assembly having a bight portion, a first arm connected to one end of said bight portion, a second arm connected to the other end of said bight portion and a hub connected to the end of each arm which is remote from said bight portion, said hubs each including a keyhole slot having a central aperture and a slot communicating with said aperture, said ends of said arms which are connected to said bight portion including an open top, said arms comprising hollow tubular members;
    a U-shaped frame member having a bight portion and parallel spaced-apart arms extending from said bight portion, the ends of said arms on said frame member which are remote from said bight portion being affixed to associated hubs on said fork and extending rearwardly from said fork approximately normal thereto; and
    an arcuate member having a first end connected to said bight portion of said fork and a second end connected to said frame member adjacent its bight portion.

6. A vehicle as stated in claim 5 including steerable means connected to said U-shaped frame member adjacent its bight portion, a large-diameter, pedal-driven front wheel rotatably mounted in said aperture in said hubs, said pedal-driven wheel including an axle insertable through said slots in said hubs to a position within said apertures, said vehicle including bearing means positionable on each end of said front wheel axle when it is in position within said apertures, each of said bearing means including an annular shoulder engageable with associated hubs on said fork, said vehicle also including retainer plate means connectable to said hubs to maintain said bearing shoulders in engagement with associated hubs.

7. A vehicle as stated in claim 5 wherein said frame includes a mounting plate affixed to said U-shaped frame member adjacent its bight portion, said steering means including a U-shaped saddle having a first arm connected to said plate, said first arm being provided with an aperture, said saddle also including a second arm having an aperture which is aligned with the aperture in said first arm to define an oblique axis, a pivot pin and means for rotatably mounting said pivot pin in said saddle apertures, biasing means including a plate affixed to said pivot pin, the major axis of said plate lying at right angles to the major axis of said pivot pin, said biasing means also including a first compression spring engaged between one end of said pivot-pin plate and the bight portion of said saddle and a second compression spring having one end engaged against the other end of said pivot-pin plate and another end engaged against said bight portion of said saddle.

8. A vehicle as stated in claim 7 wherein said pivot pin is inclined rearwardly from a vertical plane within a range of approximately 20–45 degrees.

9. A vehicle as stated in claim 5 including seat means having a pair of parallel arms telescopically engaging said fork through said open ends, said seat means including a seat portion positionable on said telescoped arms above and between said hubs and said bight portion of said U-shaped frame.

References Cited

UNITED STATES PATENTS

| | | | |
|---|---|---|---|
| 87,713 | 3/1869 | Serrell | 280—267 X |
| 455,220 | 6/1891 | Lessells | 280—268 |
| 1,018,512 | 2/1912 | Mees | 280—11.28 |
| 1,550,133 | 8/1925 | Whitehall | 280—267 |
| 2,330,147 | 9/1943 | Rodriguez | 280—87.04 |
| 2,983,522 | 5/1961 | Kirk | 280—267 |
| 3,100,020 | 8/1963 | Sonntag | 280—87.04 X |
| 3,282,606 | 11/1966 | Casner | 280—282 X |
| 3,311,388 | 3/1967 | Ryan et al. | 280—269 |

KENNETH H. BETTS, *Primary Examiner.*